(12) United States Patent
Bushey et al.

(10) Patent No.: US 11,036,194 B2
(45) Date of Patent: **\*Jun. 15, 2021**

(54) VALIDATION OF CONTROL COMMAND IN SUBSTANTIALLY REAL TIME FOR INDUSTRIAL ASSET CONTROL SYSTEM THREAT DETECTION

(71) Applicant: General Electric Company, Schenectady, NY (US)

(72) Inventors: Cody Joe Bushey, Clifton Park, NY (US); Lalit Keshav Mestha, North Colonie, NY (US); Daniel Francis Holzhauer, Burnt Hills, NY (US)

(73) Assignee: General Electric Company, Schenectady, NY (US)

( \* ) Notice: Subject to any disclaimer, the term of this patent is extended or adjusted under 35 U.S.C. 154(b) by 84 days.

This patent is subject to a terminal disclaimer.

(21) Appl. No.: 16/354,926

(22) Filed: Mar. 15, 2019

(65) Prior Publication Data

US 2019/0212710 A1 Jul. 11, 2019

Related U.S. Application Data

(63) Continuation of application No. 15/397,103, filed on Jan. 3, 2017, now Pat. No. 10,268,170.

(51) Int. Cl.
*G05B 13/04* (2006.01)
*G05B 17/02* (2006.01)

(52) U.S. Cl.
CPC ............. *G05B 13/04* (2013.01); *G05B 17/02* (2013.01)

(58) Field of Classification Search
CPC ................................ G05B 13/04; G05B 17/02
See application file for complete search history.

(56) References Cited

U.S. PATENT DOCUMENTS

| | | | | |
|---|---|---|---|---|
| 4,711,394 A | \* | 12/1987 | Samuel | ..................... H02J 3/14 236/49.3 |
| 6,526,373 B1 | \* | 2/2003 | Barral | .................... B25J 9/1666 703/6 |
| 6,801,830 B1 | \* | 10/2004 | Tomita | ................. G05B 19/406 318/568.1 |
| 7,788,189 B2 | \* | 8/2010 | Budike, Jr. | ....... H02J 13/00002 705/400 |

(Continued)

*Primary Examiner* — Ronald D Hartman, Jr.
(74) *Attorney, Agent, or Firm* — Buckley, Maschoff & Talwalkar LLC

(57) ABSTRACT

According to some embodiments, a validation platform computer may interpret at least one received data packet to identify a control command for a controller of an industrial asset control system. The at least data packet being might be received, for example, from a network associated with a current operation of the industrial asset control system. The control command may then be introduced into an industrial asset simulation executing in parallel with the industrial asset control system. A simulated result of the control command from the industrial asset simulation may be validated, and, upon validation of the simulated result, it may be arranged for the control command to be provided to the controller of the industrial asset control system. Additionally, in some embodiments failed validation of a simulated result will prompt a threat-alert signal as well as prevent the command (e.g., data packet) from continuing to the controller.

20 Claims, 9 Drawing Sheets

(56) References Cited

U.S. PATENT DOCUMENTS

| | | | | |
|---|---|---|---|---|
| 2007/0129927 A1* | 6/2007 | Chussil | ............... | G06N 3/004 |
| | | | | 703/16 |
| 2009/0055156 A1* | 2/2009 | Cooper | ............... | G06F 30/20 |
| | | | | 703/22 |
| 2009/0265157 A1* | 10/2009 | Piepenbrock | ......... | G05B 19/05 |
| | | | | 703/21 |
| 2010/0114385 A1* | 5/2010 | Dempster | ............... | F24F 11/62 |
| | | | | 700/276 |
| 2011/0131017 A1* | 6/2011 | Cheng | ............ | G05B 19/41885 |
| | | | | 703/2 |
| 2011/0251711 A1* | 10/2011 | Goel | ............ | G06F 30/23 |
| | | | | 700/104 |
| 2014/0180644 A1* | 6/2014 | Maturana | ............ | G05B 17/02 |
| | | | | 703/1 |
| 2016/0188769 A1* | 6/2016 | Aylott | ............ | G06F 30/20 |
| | | | | 703/6 |
| 2018/0075243 A1* | 3/2018 | Thomas | ............ | G06F 30/20 |
| 2018/0096153 A1* | 4/2018 | DeWitte | ............ | G06F 21/552 |
| 2020/0192340 A1* | 6/2020 | Gooch | ............ | G05B 19/41885 |

* cited by examiner

VALIDATION OF CONTROL COMMAND IN SUBSTANTIALLY REAL TIME FOR INDUSTRIAL ASSET CONTROL SYSTEM THREAT DETECTION

CROSS-REFERENCE TO RELATED APPLICATIONS

The present application is a continuation of U.S. patent application Ser. No. 15/397,103 (pending) entitled "VALIDATION OF CONTROL COMMAND IN SUBSTANTIALLY REAL TIME FOR INDUSTRIAL ASSET CONTROL SYSTEM THREAT DETECTION" and filed on Jan. 3, 2017. The entire content of that application is incorporated herein by reference.

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of a control system and may cause a total shut down or even catastrophic damage to a plant. Currently, Fault Detection Isolation and Accommodation ("FDIA") approaches only analyze sensor data, but a threat might occur in connection with other types of threat monitoring nodes. Also note that FDIA is limited only to naturally occurring faults in one sensor at a time. FDIA systems do not address multiple simultaneously occurring faults as in the case of malicious attacks. Moreover, there may be a number of different ways of measuring the performance of a threat detection system (e.g., false alerts when no threats are present, failures to create alerts when threats are in fact present, how rapidly threats can be detected, etc.). As a result, creation of a suitable threat detection system can be difficult—especially when a substantial number of monitoring nodes of different types are evaluated and various performance metrics need to be considered.

In addition, some unauthorized commands might be able to cause severe damage to an industrial asset within a few milliseconds. For example, opening or closing a breaker might cause components to rapidly become unstable and, in some cases, elements of the machine could even explode. It can be difficult to detect such quick acting problems using traditional cyber-threat detection techniques. It would therefore be desirable to facilitate creation of a suitable threat detection system to protect an industrial asset control system from cyber threats in an automatic and accurate manner.

SUMMARY

According to some embodiments, a validation platform computer may interpret at least one received data packet to identify a control command for a controller of an industrial asset control system. The at least data packet being might be received, for example, from a network associated with a current operation of the industrial asset control system. The control command may then be introduced into an industrial asset simulation executing in parallel with the industrial asset control system. A simulated result of the control command from the industrial asset simulation may be validated, and, upon validation of the simulated result, it may be arranged for the control command to be provided to the controller of the industrial asset control system. Additionally, in some embodiments failed validation of a simulated result will prompt a threat-alert signal as well as prevent the command (e.g., data packet) from continuing to the controller so that such commands protect the control system from diminished performance or a total shut down (or even catastrophic damage).

Some embodiments comprise: means for interpreting, by a validation platform computer, at least one received data packet to identify a control command for a controller of an industrial asset control system, the at least data packet being received from a network associated with a current operation of the industrial asset control system; means for introducing the control command into an industrial asset simulation executing in parallel with the industrial asset control system; means for validating a simulated result of the control command from the industrial asset simulation; and, upon validation of the simulated result, means for arranging for the control command to be provided to the controller of the industrial asset control system.

Some technical advantages of some embodiments disclosed herein are improved systems and methods to facilitate creation of a suitable threat detection system to protect an industrial asset control system from cyber threats in an automatic and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Industrial control systems that operate physical systems are increasingly connected to the Internet. As a result, these control systems may be vulnerable to threats and, in some cases, multiple attacks may occur simultaneously. Existing approaches to protect an industrial control system, such as FDIA approaches, may not adequately address these threats—especially when a substantial number of monitoring nodes of different types are evaluated and various performance metrics need to be considered.

Figure 1:
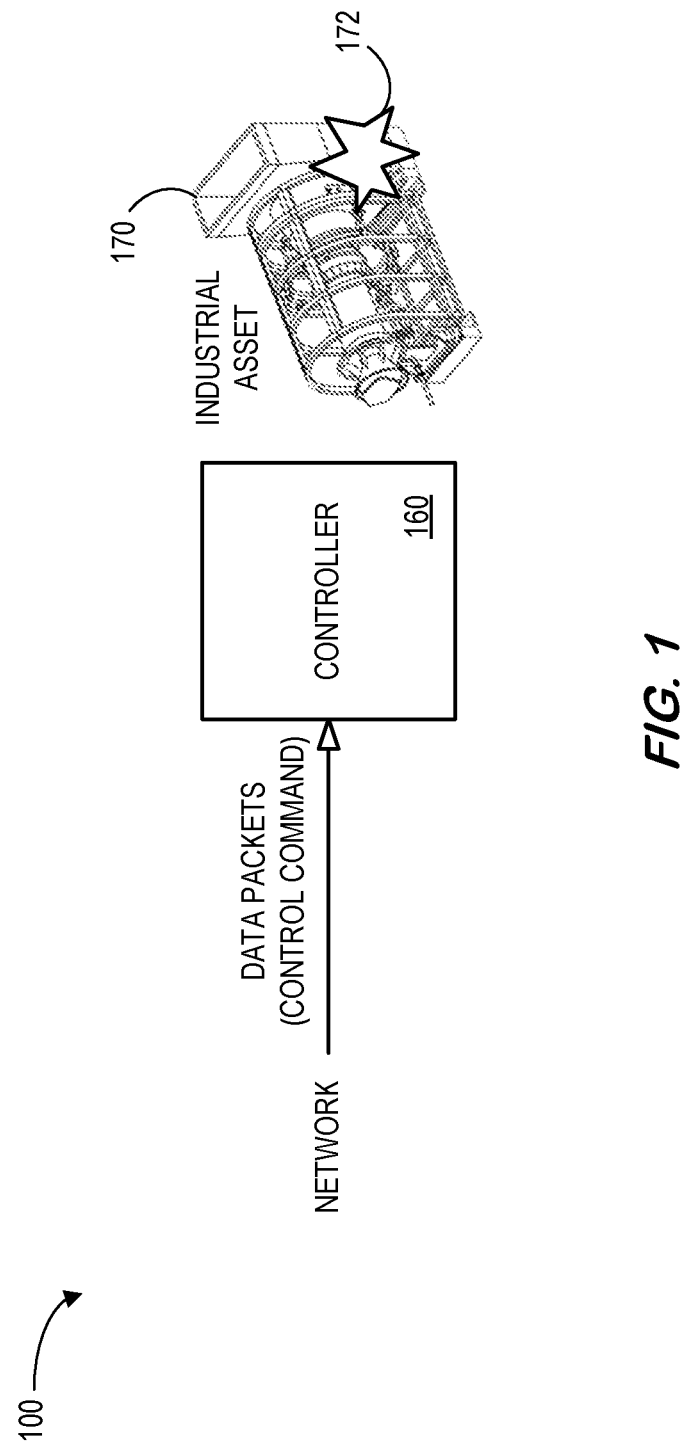
FIG. 1 is a high-level block diagram of a system.

Moreover, some unauthorized commands might be able to cause severe damage to an industrial asset within a few milliseconds. Consider, for example, the industrial asset control system 100 of FIG. 1 in which a controller 160 may act to control operation of an industrial asset 170. In particular, the controller may receive data packets via a network, including, in some cases, one or more control commands. If an unauthorized control command is received (and acted upon) by the controller 160 (e.g., by opening or closing a breaker), the industrial asset 170 might rapidly become unstable and, in some cases, elements of the machine could even explode 172. It can be difficult to detect such quick acting problems using traditional cyber-threat detection techniques. Additionally, such an attack could come from an authenticated source, such that common Information Technology ("IT") systems might not detect anything abnormal.

Figure 2:
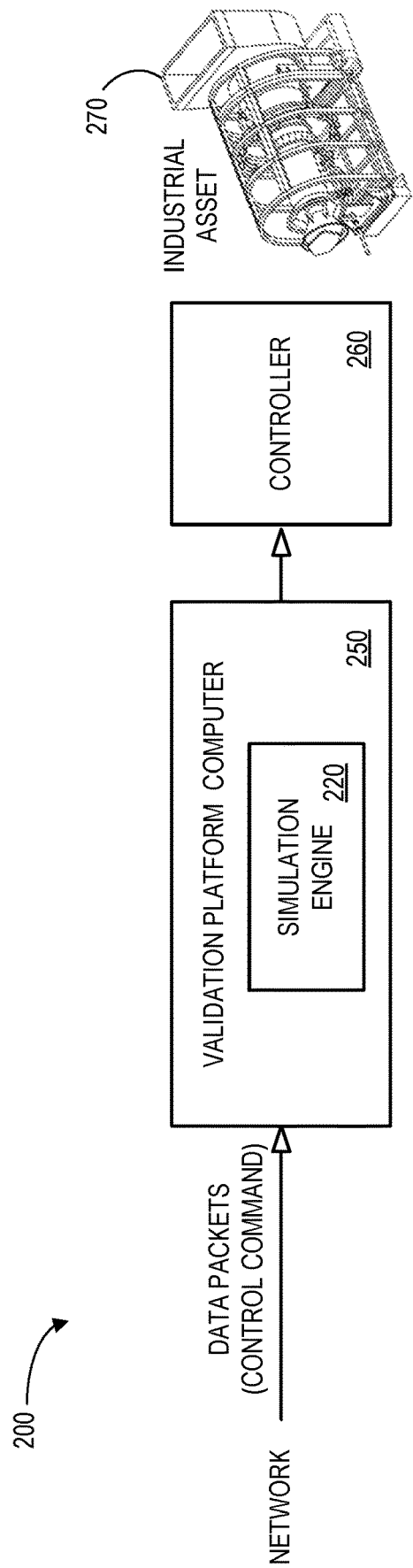
FIG. 2 is a high-level block diagram of a system that may be provided in accordance with some embodiments.

It would therefore be desirable to facilitate creation of a suitable threat detection system to protect an industrial asset control system from cyber threats in an automatic and accurate manner. FIG. 2 is a high-level architecture of a system 200 in accordance with some embodiments. The system 200 includes a controller 260 that controls operation of an industrial asset 270. Moreover, a network may provide data packets, including data packets associated with control commands. According to some embodiments, a validation platform computer 250 may be provided between the network and the controller 260. The validation platform computer 250 might include, for example, a simulation engine 220 that can be used to protect the industrial asset 270 in accordance with any of the embodiments described herein.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Although a single validation platform computer 250 is shown in FIG. 2, any number of such devices may be included. Moreover, various devices described herein might be combined according to embodiments of the present invention. For example, in some embodiments, the validation platform computer 250 and the controller 260 might comprise a single apparatus. The validation platform computer 250 functions may be performed by a constellation of networked apparatuses, in a distributed processing or cloud-based architecture.

A user may access the system 200 via one of the monitoring devices (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the validation platform computer 250.

Figure 3:
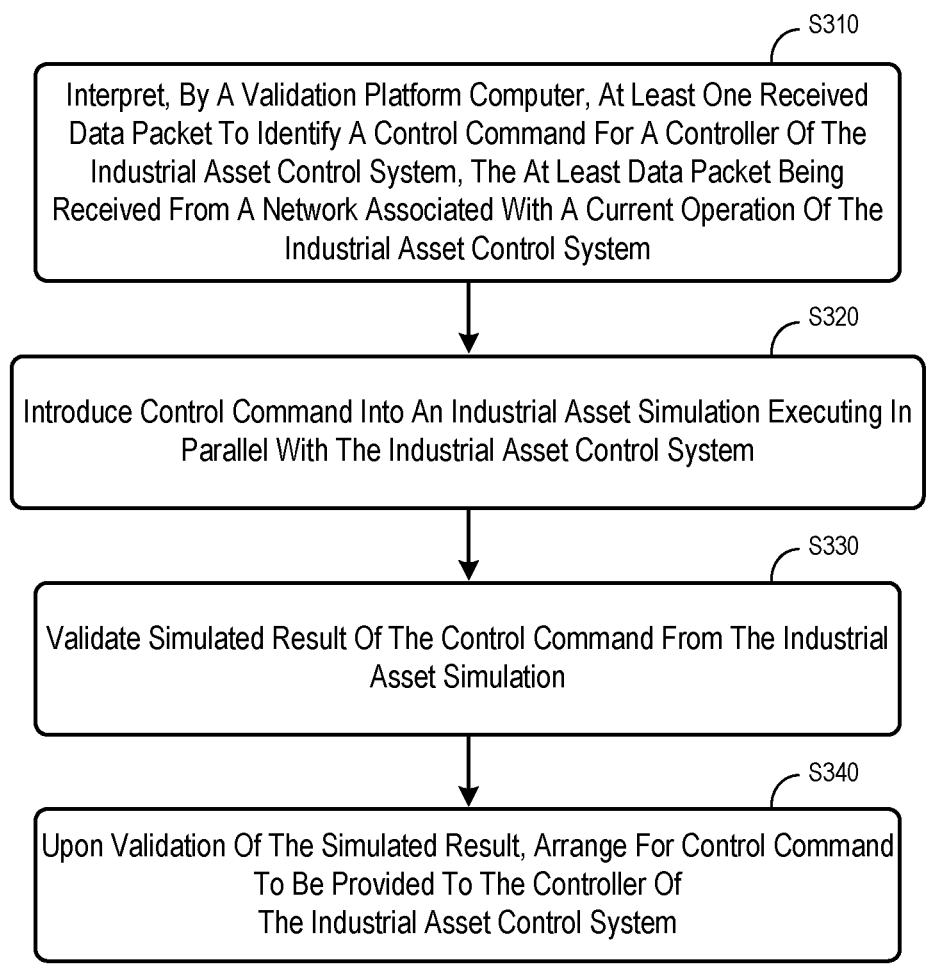
FIG. 3 is a method according to some embodiments.

FIG. 3 illustrates a method that might be performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a validation platform computer may interpret at least one received data packet to identify a control command for a controller of an industrial asset control system. The at least data packet might be received, for example, from a network associated with a current operation of the industrial asset control system. As used herein, the phrase "industrial asset control system" might be associated with, for example, a power plant, a gas turbine, a steam turbine, a generator, a locomotive, an autonomous vehicle, an aircraft engine, etc. The control command may be any instruction that causes the controller to physically alter the industrial asset. For example, a control command might be associated with a forced control constant, a forced control Boolean, a forced sensor value, a forced actuator value, etc. As other examples, a control command might be associated with an open valve command, a close valve command, an open breaker command, a close breaker command, etc.

At S320, the control command may be introduced into an industrial asset simulation that executes in parallel with the industrial asset control system. For example, the validation platform computer might include an industrial asset simulation engine to execute the industrial asset simulation. Moreover, the industrial asset simulation engine might be associated with a high-fidelity model of the industrial asset control system, at least one block of code that mimics a function model of the industrial asset control system, a transfer function algorithm, etc.

At S330, a simulated result of the control command may be validated from the industrial asset simulation. For example, the simulation might be project operation of the industrial asset, forward for a few milliseconds into the future to determine if a catastrophic failure may result from execution of the command. Upon validation of the simulated result, at S340 the system may arrange for the control command to be provided to the controller of the industrial asset control system (e.g., because the validation platform has determined that a catastrophic failure is not likely to occur as a result of execution of the command). In some embodiments, when the validation platform computer fails to validate a simulated result (e.g., the simulation determines that a severe failure is a likely result of the command from the network), it may be arranged for a control command threat alert signal to be transmitted and the control command to be discarded. Note that a threat alert signal might be transmitted, for example, using a cloud-based system, an edge-based system, a wireless system, a wired system, a secured network, a communication system, etc. Moreover, a threat alert signal might be associated with an actuator attack, a controller attack, a monitoring node attack, a plant state attack, spoofing, financial damage, unit availability, a unit trip, a loss of unit life, asset damage requiring at least one new part, etc.

Figure 4:
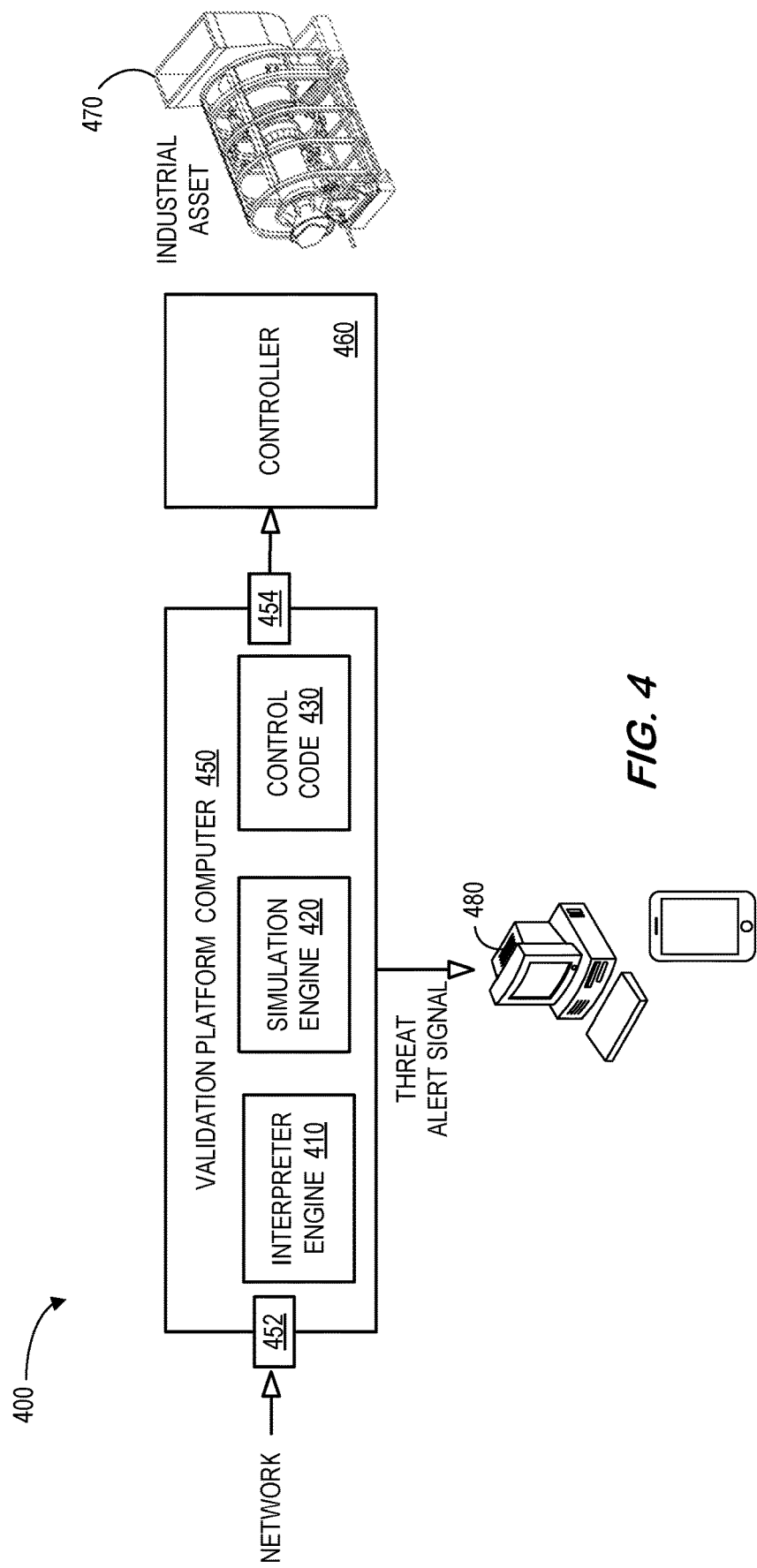
FIG. 4 is a more detailed illustration of a system that may be provided in accordance with some embodiments.

FIG. 4 is a more detailed illustration of a system 400 that may be provided in accordance with some embodiments. As before, the system 400 includes a controller 460 that controls operation of an industrial asset 470. Moreover, a network may provide data packets (e.g., via portal 452), including data packets associated with control commands. Note that as used herein, the term "portal" might refer to, for example, a communication port or a front end where data packets are received. Moreover, in some embodiments the data packets may be received as digital values. According to some embodiments, a validation platform computer 450 may be provided between the network and the controller 460. The validation platform computer 450 might include, for example, a simulation engine 420 that can be used to protect the industrial asset 470 in accordance with any of the embodiments described herein. The validation platform computer 450 might further include, according to some embodiments, an interpreter engine 410 to interpret a received data packet to identify the control command for the controller 460 of the industrial asset 470. For example, the interpreter engine 410 might perform protocol translation, a decryption function, data integrity check, etc.

According to some embodiments, the validation platform computer 450 also includes a control code engine 430 to monitor the simulated result of the control command from the industrial asset simulation engine 420. The control code engine 430 might be associated with, for example, one or more "monitoring nodes" that represent normal operation of an industrial asset control system (e.g., generated by a model). As used herein, the phrase "monitoring node" might refer to, for example, sensor data, signals sent to actuators, motors, pumps, and auxiliary equipment, intermediary parameters used for monitoring purposes that are not direct sensor signals not the signals sent to auxiliary equipment, and/or control command(s). These may represent, in some cases, threat monitoring nodes that receive data from a threat monitoring system in a continuous fashion in the form of continuous signals or streams of data or combinations thereof. Moreover, the nodes may be used to monitor occurrences of cyber-threats or abnormal events. In addition, the validation platform computer 450 might further include an output port 454 to provide a control command to the controller 460 (e.g., after the system 400 determines that the command is safe). According to some embodiments, the output port 454 is implemented using a digital value within the controller 460 when the controller 460 and validation platform computer 450 are closely integrated (with need a separate hardware port). Moreover, according to some embodiments the output port 454 may be implemented using a digital value sent over a network to the controller 460. Note that the controller 460 itself may further include at least one subsequent cyber-threat detection mechanism (e.g., in addition to the protection provided by the validation platform computer 450). When control code 430 detects a potential problem, the infringing command may be prevented from reaching the controller 460 and threat alert signal may be transmitted to an administrator device 480 (e.g., for further investigation).

In this way, embodiments may provide systems and methods for validating control commands(s), such as forced control constants, forced control Boolean(s) and/or forced sensor/actuator values. In an Industrial Control System ("ICS"), hardware may need to be deterministic (e.g., predictable, repeatable, and reliable). This typically leads to the use of specialized controllers which control the machine for the given application. Given a typical ICS, there may be numerous signals or commands that can be sent to the controller 460 which could open or close valves (or open or close breakers). Embodiments provided herein may interpret these commands off from the network, and then implement the commands into a running simulation of the machine to quickly validate whether the command being sent will produce unfavorable results. The usefulness of such a system is only increased by the fact that these types of actions can occur in milliseconds, and can cause instantaneous damage to the system. An attack might be injected, the motors/actuators excited, causing a substantial disruption before any of the sensors can be read or responded to accordingly. An additional protection layer as described herein may help validate commands in substantially real-time to ensure that a system is not being attacked.

Figure 5:
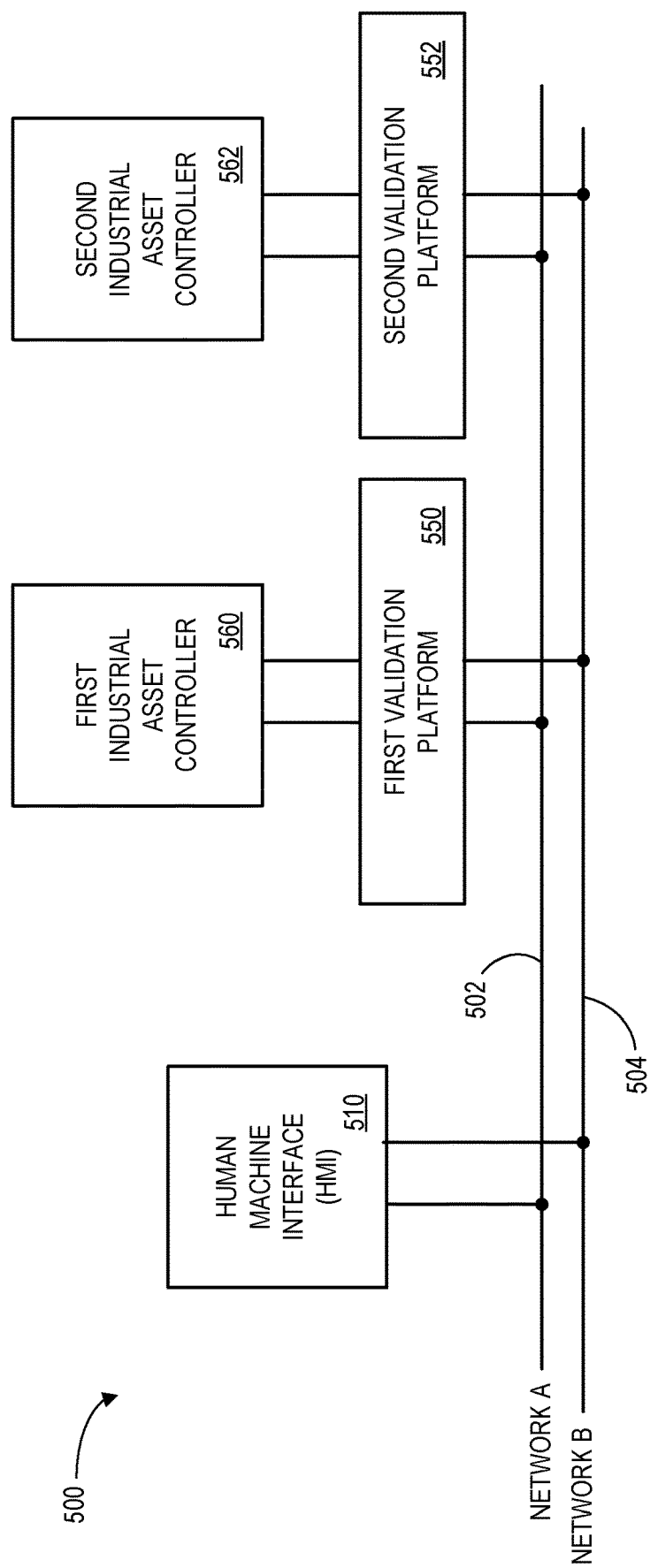
FIG. 5 is a diagram of an industrial control system network according to some embodiments.

Consider, for example, FIG. 5 which is a diagram of an industrial control system network 500 according to some embodiments. The network 500 includes network A 502 and network B 504 (e.g., for redundancy). Moreover, a Human Machine Interface ("HMI") 510 and two industrial asset controllers 560, 562 may be provided. According to some embodiments, a pair of validation platforms 550, 552 are positioned between the industrial asset controllers 560, 562 and the networks 502, 504.

Note that a real life scenario exists where a command can be sent to one or both of the industrial asset controllers 560, 562, and the command can immediately damage (or even destroy) the industrial asset. Such commands might include, for example, expert level knowledge of the system, simply switching a signal from true to false, etc. Many serious attacks that could destroy machinery are not very sophisticated, and the scope of such scenarios is substantial with respect to industrial control systems. Some products may limit the likelihood of an attack occurring, such as data traffic encryption (to prevent attacks from originating from an external network connection), user login privileges on the HMI 510, etc. While these can limit the attack surface, such protection layers are well known to attackers and (with the proper level of expertise) the protection can be circumvented. For example, one hole in security may be an ability to send non-malware commands to the controllers 560, 562 (which the controller 560, 562 will then execute in the servos and actuators of the system). Given the right commands in power generation, for example, a gas turbine, or even entire power island (including a gas turbine, a steam turbine, and/or a generator) could be destroyed and even have components explode from associated housings.

In order to overcome this problem, embodiments may be provided on a network such that the system has the ability to intercept data packets traveling to a controller. An algorithm, running on any appropriate hardware platform, may then interpret the packet (e.g., by understanding a protocol, decrypting it, etc.). When the command is understood, the algorithm may simulate the machinery response to the command using a model (or some simplified blocks of code that mimic a functional model tied into proper application code). Effectively, the model/application code may serve as a transfer function, where the function accepts the command and outputs a Boolean indicating whether or not the command can be safely executed in the real machinery. The algorithm might be able to determine this, for example, through some metrics that indicate if the command had only a minor effect or it instead was catastrophic (such as a unit trip or worse). With this knowledge, the algorithm can take accommodative measures (e.g., by allowing the command to continue or terminating the command).

Figure 6:
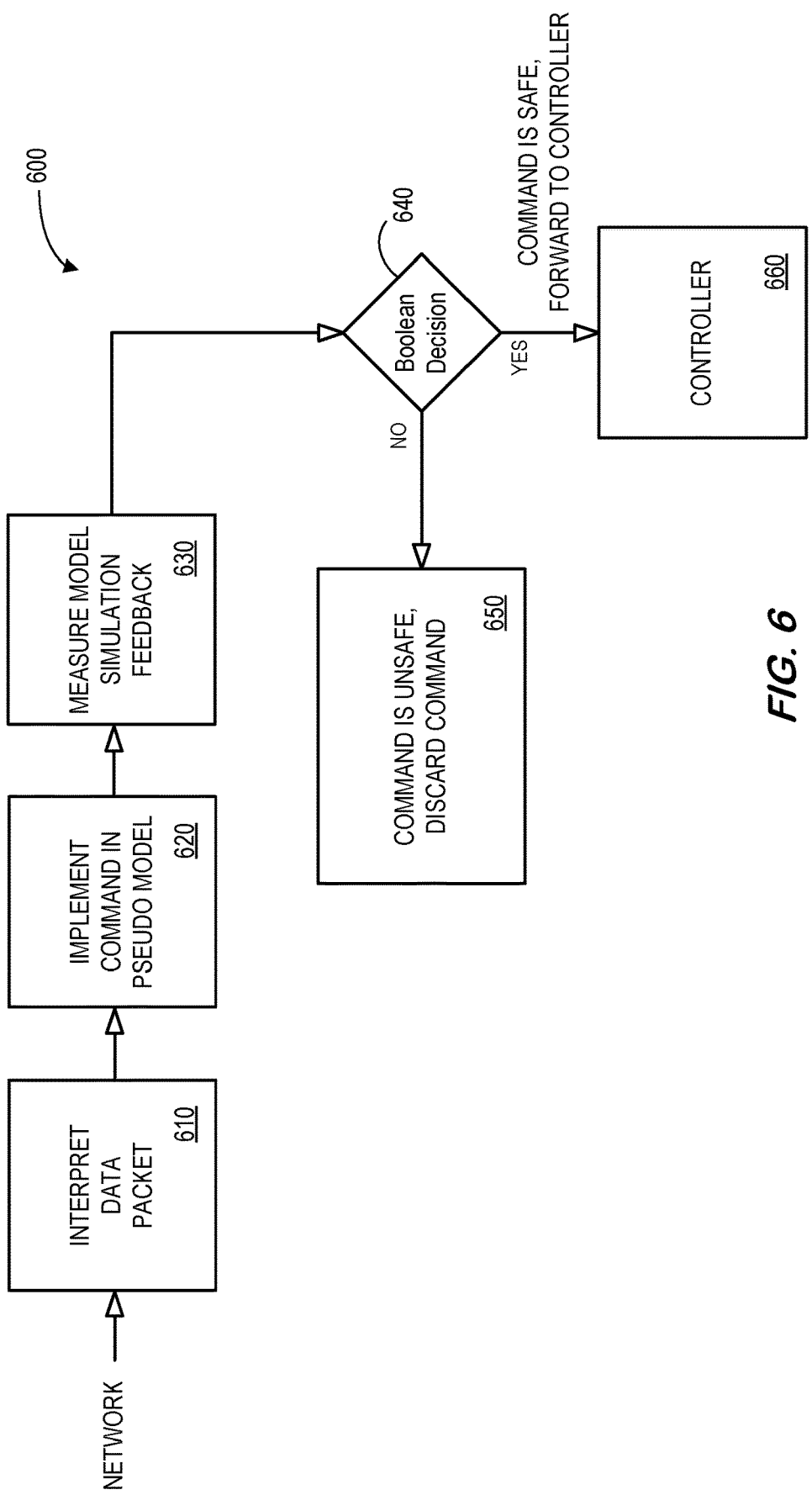
FIG. 6 is a flow chart of an algorithm in accordance with some embodiments.

For example, FIG. 6 is a flow chart of an algorithm 600 in accordance with some embodiments. Initially, a data packet from a network may be interpreted 610. Any detected control commands may then be implemented in a pseudo model 620 and model simulation feedback may be measured 640. If a Boolean decision 640 indicates that the command will cause damage, the command is unsafe and discarded 650. If the Boolean decision 640 indicates that the command will not cause damage, the command is safe and forwarded to a controller 650. The pseudo model 620 in some embodiments may contain both the high-fidelity model of the system and the control code.

While there are IT and OT layers of protection currently being implemented for an Industrial Control System ("ICS"), the need for advanced cyber protection is growing. For example, one emerging problem is how to protect ICS machinery when signals are forced to some value or Boolean condition. The controllers used in these applications run in substantially real-time, and therefore the consequences of such an attack would be immediate. In the case of power generation, for example, if a command to open a breaker was sent, it could trip the unit at a minimum, and a total failure could even occur if the attack was properly implemented. Some embodiments described herein may run faster as compared to the controller, intercept a command, interpret it, validate it, and then either act against the command or allow it to pass.

Figure 7:
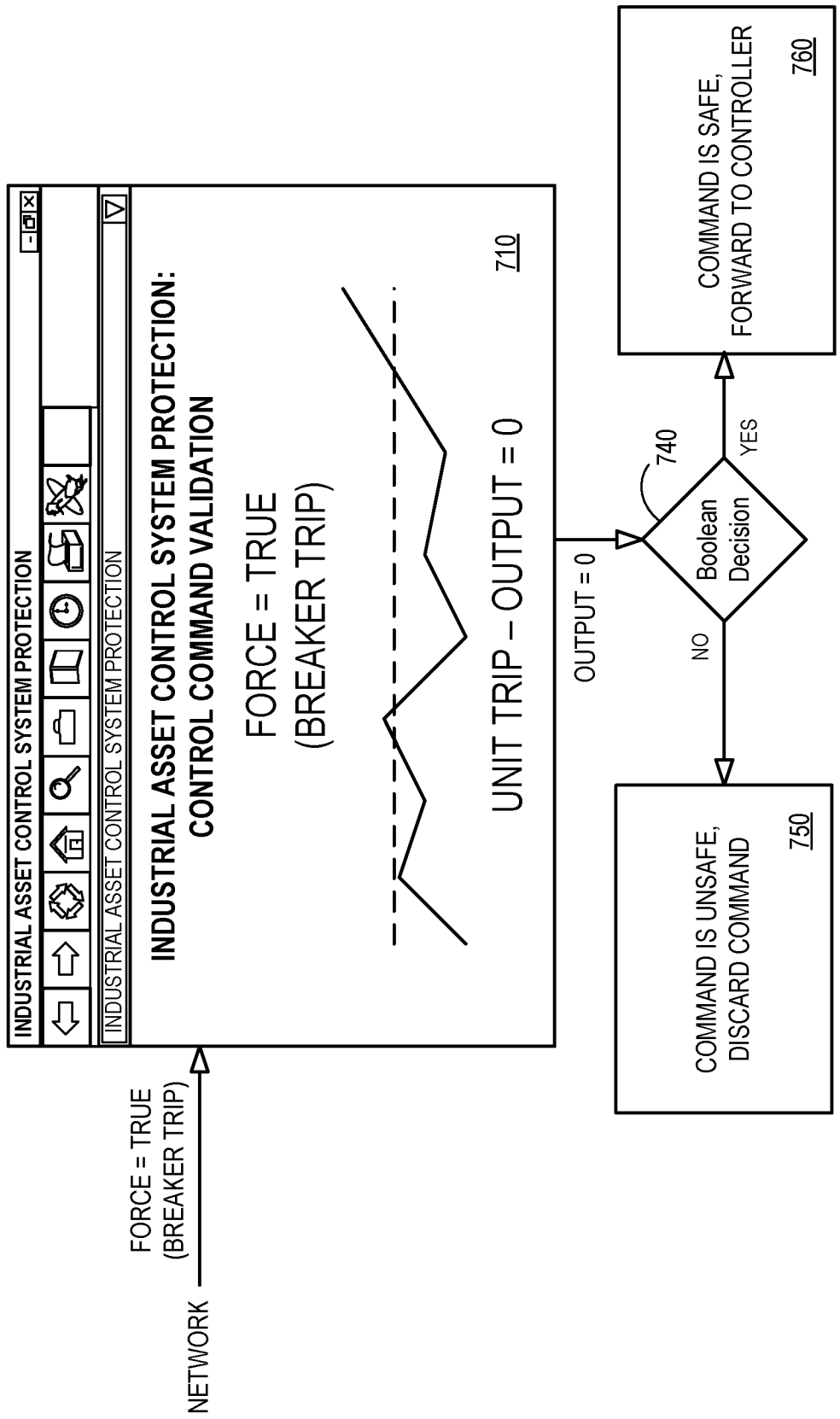
FIG. 7 illustrates an information flow according to some embodiments.

FIG. 7 illustrates an information flow 700 according to some embodiments. In particular, a command may be received via a network (e.g., "Force=True (Breaker Trip)"). A simulation, reflected by a display 710 in FIG. 7, may determine a result of such a command (e.g., do one or more monitored values exceed a pre-determined threshold value). If the simulation indicates that a problem will likely occur, a Boolean decision 740 determines that the command is unsafe (and is therefore discarded) 750. If the simulation indicates that no problem will probably occur, the Boolean decision 740 indicates that the command is safe and it is allowed to be provided to the controller 760 (where it will be executed in the actual machinery).

Note that cyber security concerns are growing by the day, and there are multiple forces driving customers to the market for cyber security protection. For example, regulations, such as those specific to power generation, may require that an enterprise meet certain guidelines, and, as a result, products and services that enable them to meet these standards may be desired. Another driving force is that an enterprise may want to protect assets. With ICS cyber-attacks on the rise, many enterprises are starting to explore ways to protect investments. Note that as the Internet of Things ("IoT") continues to grow, the likelihood of cyber threats will probably also grow.

Thus, embodiments may pull commands off the network prior to execution by a controller. Embodiments may feed these commands into a fused simulation of an ICS model to generate virtual output. The output of this effective transfer function might comprise a metric indicting whether to allow (or disallow) the command from execution by the actual controller. Such a system may act as a "subconscious," substantially real-time first level cyber protection layer acting solely on a virtual machine. Note that other algorithms running at the domain layer might be provided to pick up additional (e.g., more complex) threats.

Figure 8:
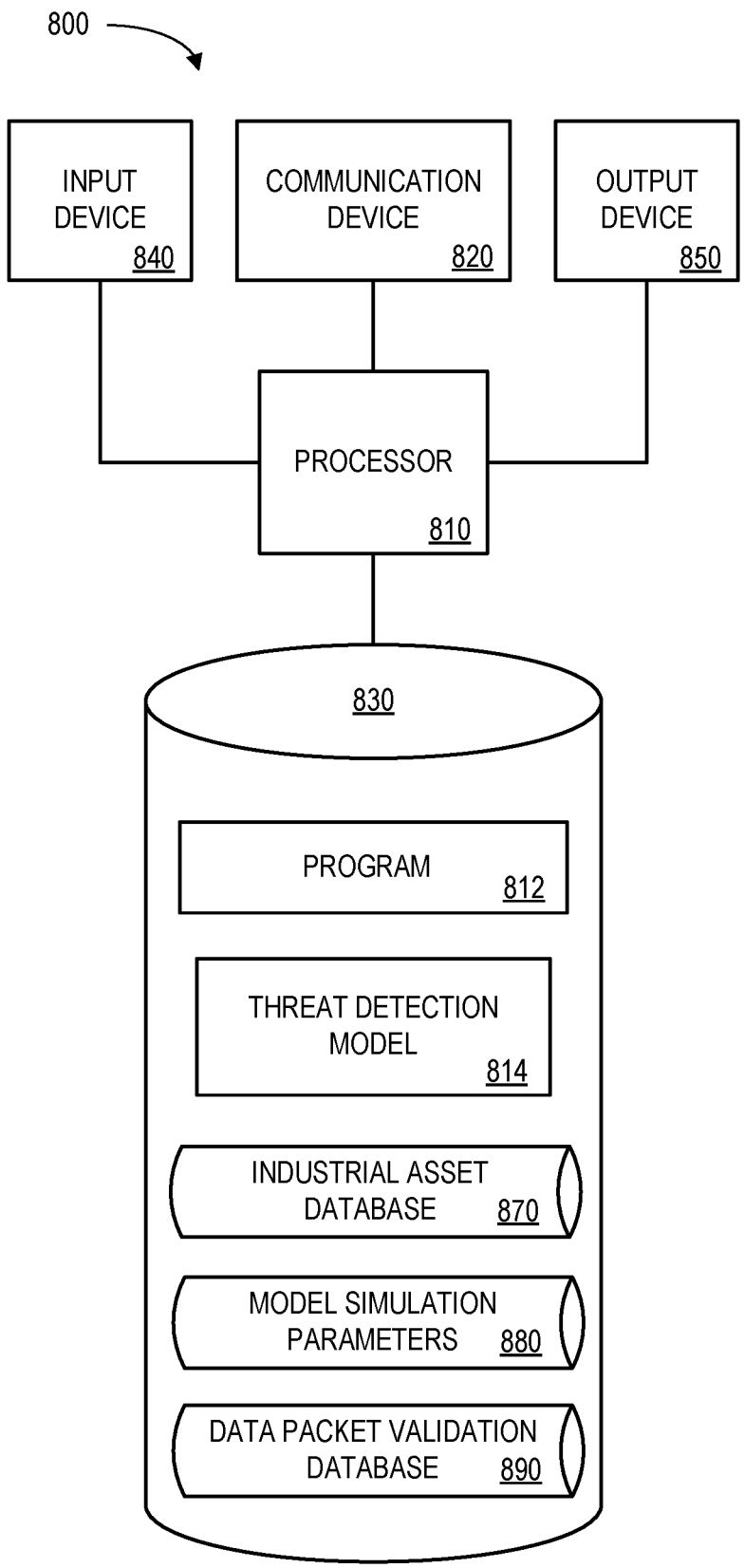
FIG. 8 is a block diagram of an industrial asset control system protection platform according to some embodiments of the present invention.

The embodiments described herein may be implemented using any number of different hardware configurations. For example, FIG. 8 is a block diagram of an industrial asset control system protection platform 800 that may be, for example, associated with the system 200 of FIG. 2. The industrial asset control system protection platform 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote monitoring nodes, user platforms, etc. The industrial asset control system protection platform 800 further includes an input device 840 (e.g., a computer mouse and/or keyboard to input modeling information) and/an output device 850 (e.g., a computer monitor to render a display, provide alerts, transmit recommendations, create reports, etc.). According to some embodiments, a mobile device, monitoring physical system, and/or PC may be used to exchange information with the industrial asset control system protection platform 800.

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or a threat detection model 814 for controlling the processor 810. The processor 810 performs instructions of the programs 812, 814, and thereby operates in accordance with any of the embodiments described herein. For example, the processor 810 may interpret at least one received data packet to identify a control command for a controller of an industrial asset control system. The at least data packet being might be received, for example, from a network associated with a current operation of the industrial asset control system. The control command may then be introduced by the processor 810 into an industrial asset simulation executing in parallel with the industrial asset control system. A simulated result of the control command from the industrial asset simulation may be validated by the processor 810, and, upon validation of the simulated result, the processor 810 may arrange for the control command to be provided to the controller of the industrial asset control system.

The program 812 and a threat detection model 814 may be stored in a compressed, uncompiled and/or encrypted format. The programs 812, 814 may furthermore include other program elements, such as an operating system, clipboard application, a database management system, and/or device drivers used by the processor 810 to interface with peripheral devices.

As used herein, information may be "received" by or "transmitted" to, for example: (i) the industrial asset control system protection platform 800 from another device; or (ii) a software application or module within the industrial asset control system protection platform 800 from another software application, module, or any other source.

In some embodiments (such as the one shown in FIG. 8), the storage device 830 further stores an industrial asset database 870 (e.g., storing information about controllers), model simulation parameters 880 (e.g., to let a validation platform simulate execution of incoming commands), and a data packet validation database 890. An example of a database that may be used in connection with the industrial asset control system protection platform 800 will now be described in detail with respect to FIG. 9. Note that the databases described herein are only examples, and additional and/or different information may be stored therein. Moreover, various databases might be split or combined in accordance with any of the embodiments described herein.

Figure 9:
FIG. 9 is a tabular portion of a data packet validation database in accordance with some embodiments.

Referring to FIG. 9, a table is shown that represents the data packet validation database 900 that may be stored at the industrial asset control system protection platform 800 according to some embodiments. The table may include, for example, entries associated with data packets that have been received in connection with an industrial asset control system. The table may also define fields 902, 904, 906, 908, 910 for each of the entries. The fields 902, 904, 906, 908, 910 may, according to some embodiments, specify: a data packet identifier 902, a control command 904, a simulation input 906, a result 908, and an output 910. The data packet validation database 900 may be created and updated, for example, in substantially real time as a physical system is monitored and modeled.

The data packet identifier 902 may be, for example, a unique alphanumeric code identifying information that has been received from a network (with the intention of being eventually provided to a controller). The control command 904 might describe any commands that were detected in the data packet (e.g., to open a valve, close a breaker, etc.). The simulation input 906 might indicate how the validation platform will simulate execution of the control command 904 (e.g., which values are being forced into the simulation) and the result 908 might indicate whether or not the input 906 caused any damage. If the result 908 indicates that damage will occur, a threat alert signal is output 910 and the command is suppressed. If the result 908 does not indicate that damage will occur, the command is provided to the controller as an output 910.

Thus, embodiments may provide an industrial asset with cyber-attack protection from malicious control commands in substantially real time (e.g., via a simulation executing in parallel with actual operation of the machinery).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc. Moreover, note that any of the interpreting, introducing, and/or validating functions described herein might be performed based at least in part on an online update received from a remote industrial asset control system information source. For example, on online update might automatically support new types of data packets, new simulation features for an industrial asset, etc.

According to some embodiments, information about attack statuses may be interwoven between different industrial asset plants. For example, one power plant might be aware of the status of other nodes (in other power plants) and such an approach might further help thwart coordinated cyber-threats. In addition to automatic threat detection, some embodiments described herein might provide systems with an additional cyber layer of defense and be deployable without custom programming (e.g., when using operating data). Some embodiments may be sold with a license key and could be incorporated as monitoring service. For example, data might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The Invention claimed is:

1. A system to protect an industrial asset control system, comprising:
   a portal to receive data packets from a network associated with a current operation of the industrial asset control system;
   a validation platform computer, coupled to the portal, to:
   (i) interpret at least one received data packet to identify a control command for a controller of the industrial asset control system,
   (ii) introduce the control command into an industrial asset simulation executing in parallel with the industrial asset control system,
   (iii) validate a simulated result of the control command from the industrial asset simulation,
   (iv) upon validation of the simulated result, cause the control command to be provided to the controller of the industrial asset control system such that the controller executes the control command to alter the industrial asset; and
   (v) upon a failure to validate a simulated result, cause a control command threat alert signal to be transmitted and for the control command to be discarded without being provided to the controller of the industrial asset control system.

2. The system of claim 1, wherein the validation platform computer includes an interpreter engine to interpret the at least one received data packet to identify the control command for the controller of the industrial asset control system.

3. The system of claim 2, wherein the interpreter engine is to perform at least one of the following: protocol translation, and a decryption function.

4. The system of claim 1, wherein the validation platform computer includes an industrial asset simulation engine to execute the industrial asset simulation.

5. The system of claim 4, wherein the industrial asset simulation engine is associated with at least one of: a high-fidelity model of the industrial asset control system, at least one block of code that mimics a function model of the industrial asset control system, and a transfer function algorithm.

6. The system of claim 1, wherein the validation platform computer includes a control code engine to monitor the simulated result of the control command from the industrial asset simulation.

7. The system of claim 1, further comprising:
   an output port, coupled to the validation platform computer, to provide the control command to the controller of the industrial asset control system.

8. The system of claim 7, further comprising:
   the controller of the industrial asset control system, coupled to the output port, wherein the output port is a digital value sent over a network to the controller.

9. The system of claim 8, wherein the controller further includes at least one subsequent cyber-threat detection mechanism.

10. The system of claim 1, wherein the control command is associated with at least one of: a forced control constant, a forced control Boolean, a forced sensor value, and a forced actuator value.

11. The system of claim 1, wherein the control command is associated with at least one of: an open valve command, a close valve command, an open breaker command, and a close breaker command.

12. The system of claim 1, wherein at least one of said interpreting, introducing, and validating are performed based at least in part on an online update received from a remote industrial asset control system information source.

13. The system of claim 12, wherein the threat alert signal transmission is performed using at least one of: a cloud-based system, an edge-based system, a wireless system, a wired system, a secured network, and a communication system.

14. The system of claim 12, wherein the threat alert signal is associated with at least one of: an actuator attack, a controller attack, a monitoring node attack, a plant state attack, spoofing, financial damage, unit availability, a unit trip, a loss of unit life, and asset damage requiring at least one new part.

15. The system of claim 1, wherein the industrial asset control system is associated with at least one of: a power plant, a gas turbine, a steam turbine, a generator, a locomotive, an autonomous vehicle, and an aircraft engine.

16. The system of claim 1, wherein the data packets received by the portal are received as digital values.

17. A computerized method to protect an industrial asset control system, comprising:
   interpreting, by a validation platform computer, at least one received data packet to identify a control command for a controller of the industrial asset control system, the at least data packet being received from a network associated with a current operation of the industrial asset control system;
   introducing the control command into an industrial asset simulation executing in parallel with the industrial asset control system;
   validating a simulated result of the control command from the industrial asset simulation;
   upon validation of the simulated result, cause the control command to be provided to the controller of the industrial asset control system for execution, such that the control command causes the controller to physically alter the industrial asset; and
   upon a failure to validate the simulated result, cause a control logical command threat alert signal to be transmitted and for the control command to be discarded without being provided to the controller of the industrial asset control system.

18. The method of claim 17, wherein the validation platform computer includes:
   an interpreter engine to interpret the at least one received data packet to identify the control command for the controller of the industrial asset control system,
   an industrial asset simulation engine to execute the industrial asset simulation, and
   a control code engine to monitor the simulated result of the control command from the industrial asset simulation.

19. A non-transient, computer-readable medium storing instructions to be executed by a processor to perform a method of protecting an industrial asset control system, the method comprising:
   interpreting, by a validation platform computer, at least one received data packet to identify a control command for a controller of the industrial asset control system, the at least data packet being received from a network associated with a current operation of the industrial asset control system;
   introducing the control command into an industrial asset simulation executing in parallel with the industrial asset control system;
   validating a simulated result of the control command from the industrial asset simulation;
   upon validation of the simulated result, causing the control command to be provided to the controller of the industrial asset control system to cause a control input to the industrial asset; and
   upon a failure to validate the simulated result, cause a control logical command threat alert signal to be transmitted and for the control command to be discarded without being provided to the controller of the industrial asset control system.

20. The medium of claim 19, wherein the validation platform computer includes:
   an interpreter engine to interpret the at least one received data packet to identify the control command for the controller of the industrial asset control system,
   an industrial asset simulation engine to execute the industrial asset simulation, and
   a control code engine to monitor the simulated result of the control command from the industrial asset simulation.

* * * * *